(12) United States Patent
Carew et al.

(10) Patent No.: US 6,366,821 B1
(45) Date of Patent: Apr. 2, 2002

(54) APPARATUS AND METHOD OF PROVIDING CONFIGURATION INFORMATION TO AN OPERATOR OF A WORK MACHINE

(75) Inventors: Kevin J. Carew, Peoria, IL (US); Randal K. Krieg, Wasilla, AK (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/159,070

(22) Filed: Sep. 23, 1998

(51) Int. Cl.[7] .............................................. G05B 11/01
(52) U.S. Cl. ........................ 700/17; 700/22; 700/25; 700/19; 700/83; 702/85; 702/183; 702/185; 340/517; 340/901; 340/959; 340/988; 345/684; 701/50; 172/2
(58) Field of Search ............................. 340/958, 959, 340/517, 901; 700/1, 2–15, 19, 20, 26, 28, 83–84, 86; 345/266, 684, 754; 701/50; 172/2, 4.5, 7, 85; 702/183, 184, 185; 180/22; 713/23, 9

(56) References Cited

U.S. PATENT DOCUMENTS

| | | | | |
|---|---|---|---|---|
| 5,579,524 A | * | 11/1996 | Kikinis | 713/324 |
| 5,648,898 A | * | 7/1997 | Moore-McKee et al. | 700/86 |
| 5,650,929 A | * | 7/1997 | Potter et al. | 455/456 |
| 5,657,224 A | * | 8/1997 | Lonn et al. | 701/29 |
| 5,781,101 A | * | 7/1998 | Stephen et al. | 340/268.02 |
| 5,949,330 A | * | 9/1999 | Hoffman et al. | 340/438 |
| 5,956,255 A | * | 9/1999 | Flamme | 700/244 |
| H1840 H | * | 2/2000 | Carew et al. | 702/85 |
| 6,026,773 A | * | 2/2000 | LaBelle | 123/179.3 |
| 6,039,141 A | * | 3/2000 | Denny | 180/329 |
| 6,061,617 A | * | 5/2000 | Berger et al. | 701/50 |
| 6,119,376 A | * | 9/2000 | Stump | 37/348 |
| 6,212,483 B1 | * | 4/2001 | Carew et al. | 702/183 |

* cited by examiner

Primary Examiner—William Grant
Assistant Examiner—Ramesh Patel
(74) Attorney, Agent, or Firm—Byron G. Buck, II

(57) ABSTRACT

An apparatus and method of providing configuration information to an operator of a work machine adapted to be configured for performing a plurality of work functions. Whether the work machine control system is in power up mode is determined. Configuration parameters are read from memory and provided to the operator.

4 Claims, 4 Drawing Sheets

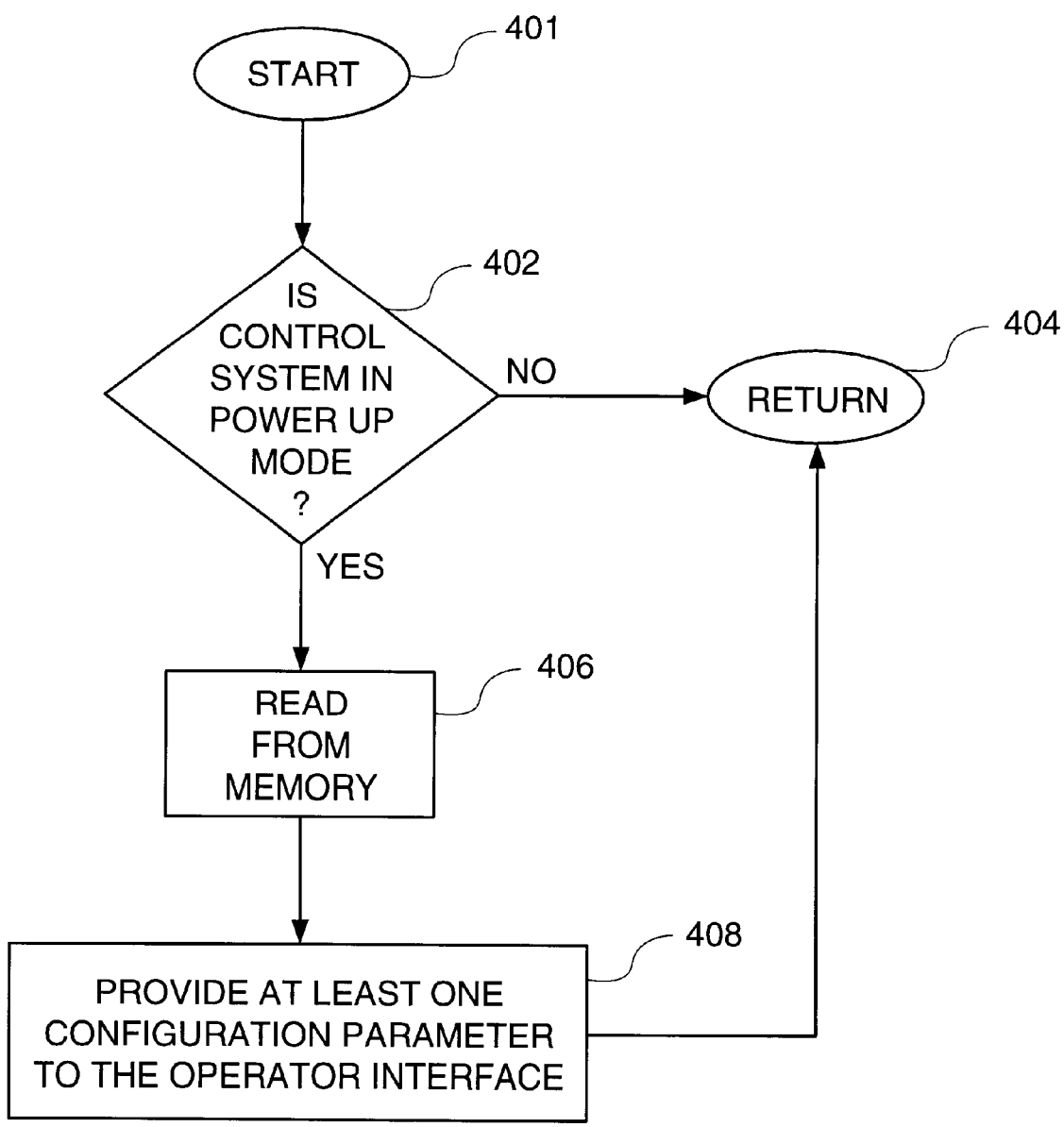

APPARATUS AND METHOD OF PROVIDING CONFIGURATION INFORMATION TO AN OPERATOR OF A WORK MACHINE

TECHNICAL FIELD

This invention relates generally to an apparatus and method of providing configuration information to an operator of a work machine and, more particularly, to an apparatus and method that provides configuration information to an operator while the work machine control system is in power-up mode.

BACKGROUND ART

Work machines having an attached implement, such as motor graders, excavators, mining shovels, backhoe loaders, wheel loaders, track type tractors, and the like, are used for moving earth. Such implements may include blades, impact rock rippers, and other material handling apparatus. Typically, work machines may be configured to perform various work cycles. For example, a motor grader typically has a blade used to cut a particular grade and/or slope across the ground. Because the motor grader has many joints having a range of movement, many parameters are used to provide electronic control of the blade. These parameters can be in different languages, can be in different units, or can be in an enabled or disabled state.

Currently, on work machines, it is possible to damage the machine or incorrectly move or cut the earth if the work machine is not configured properly. For example, on a motor grader, if the grade is set in inches instead of centimeters or the slope is set in percent instead of degrees, a motor grader will not cut the proper grade and/or slope across the ground. This could cause damage to the blade of the motor grader or provide an incorrect finished grade and/or slope across the ground.

It is undesirable to force the operator to enter configuration mode in order to learn the current configuration of the work machine, particularly in multiple shift construction or mining operations where one operator immediately replaces another operator and continues to operate the work machine. In this situation, different operators may have different native languages, prefer to operate in different units of measure, or prefer different parameters be in an enabled or disabled state.

Accordingly, the art has sought an apparatus and method of providing configuration information to an operator of a work machine adapted to be configured for performing a plurality of work functions which: automatically provides configuration parameters to the operator during power up; eliminates the need for an operator to enter configuration mode or provide additional commands to learn the configuration of the work machine; reduces demands on the operator; and is more economical to manufacture and use.

The present invention is directed to overcoming one or more of the problems as set forth above.

DISCLOSURE OF THE INVENTION

In one aspect of the present invention, a work machine adapted to be controlled by an operator and configured for performing a plurality of work functions is provided. The work machine includes a frame, a plurality of ground engaging devices, an operator compartment, an engine, and a configuration system. The frame is supported by the plurality of ground engaging devices. The engine is operably coupled to the ground engaging devices and the operator compartment is supported by the ground engaging devices. The configuration system includes a memory, an operator interface, and a controller. The memory is adapted to store at least one configuration parameter. The operator interface is adapted to provide the at least one configuration parameter to the operator. The controller is associated with the memory and adapted to receive the at least one configuration parameter, determine whether the control system is in power up mode, and responsively provide the at least one configuration parameter to the operator interface.

In another aspect of the present invention, a method of providing configuration information to an operator of a work machine adapted to be configured for performing a plurality of work functions is provided. A determination is made as to whether the work machine control system is in power up mode. At least one configuration parameter is read from a memory. Additionally, the at least one configuration parameter is provided to the operator.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings, in which:

FIG. 4 is a flowchart of software logic implemented in a preferred embodiment of the present invention.

BEST MODE FOR CARRYING OUT THE INVENTION

Figure 1:
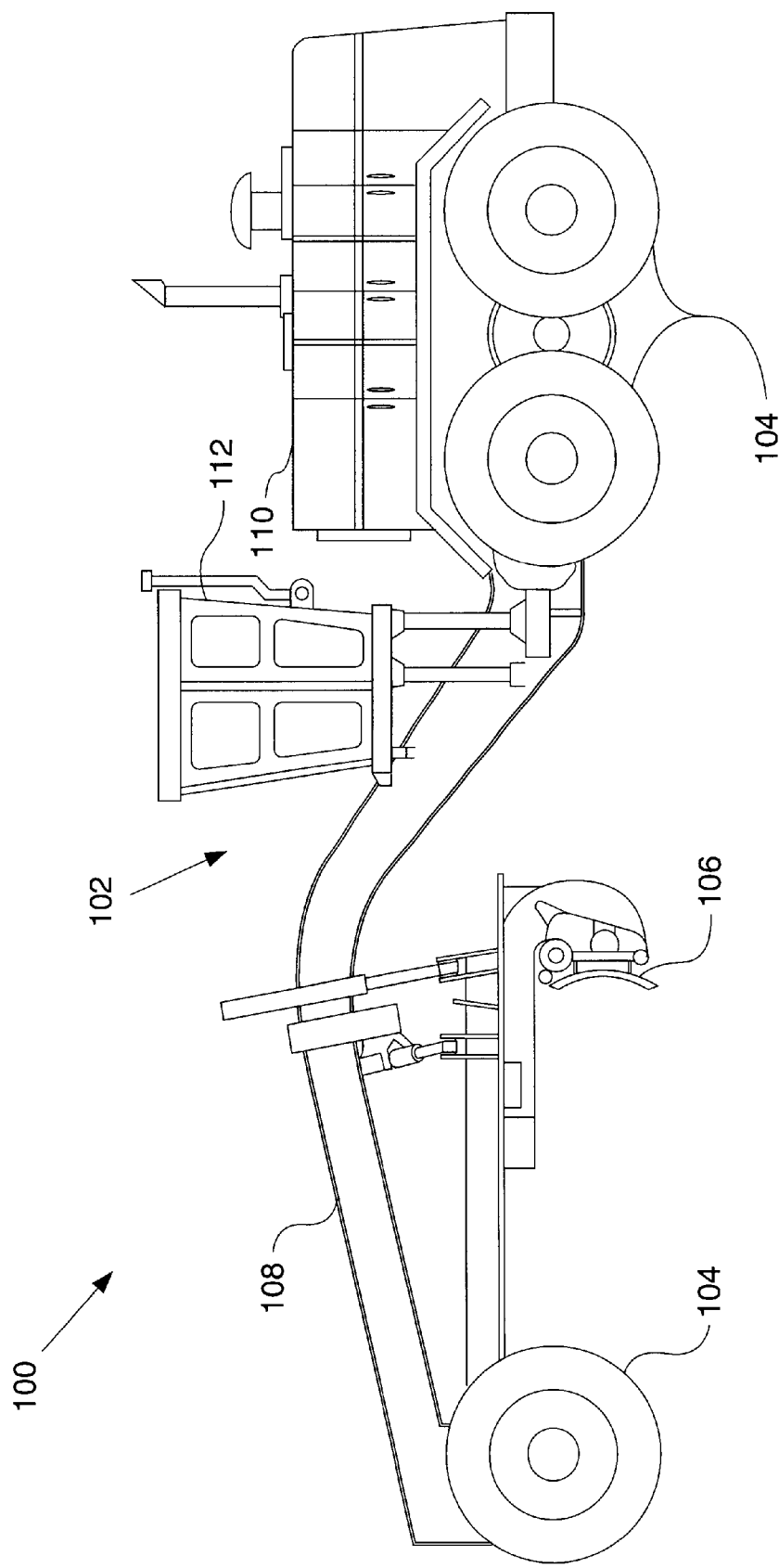
FIG. 1 is a side elevational view of a motor grader according to one embodiment of the present invention.

A preferred embodiment of the present invention provides an apparatus and method of providing configuration information to an operator of a work machine 100 adapted to be configured for performing a plurality of work functions. The following description uses a motor grader 102 having ground engaging devices, or wheels, 104 and a blade 106 as an example only. This invention can be applied to other types of work machines 100 having tracks (not shown) instead of wheels 104 and other types of implements well known in the art. Other examples include mining shovels, wheel loaders, backhoe loaders, track type tractors, hydraulic excavators, rack type loaders, and the like.

In FIG. 1, a frame 108 is supported by a plurality of ground engaging devices 104. An engine 110 is operably coupled to the ground engaging devices 104. Additionally, an operator compartment 112 is supported by the ground engaging devices 104.

Figure 2:
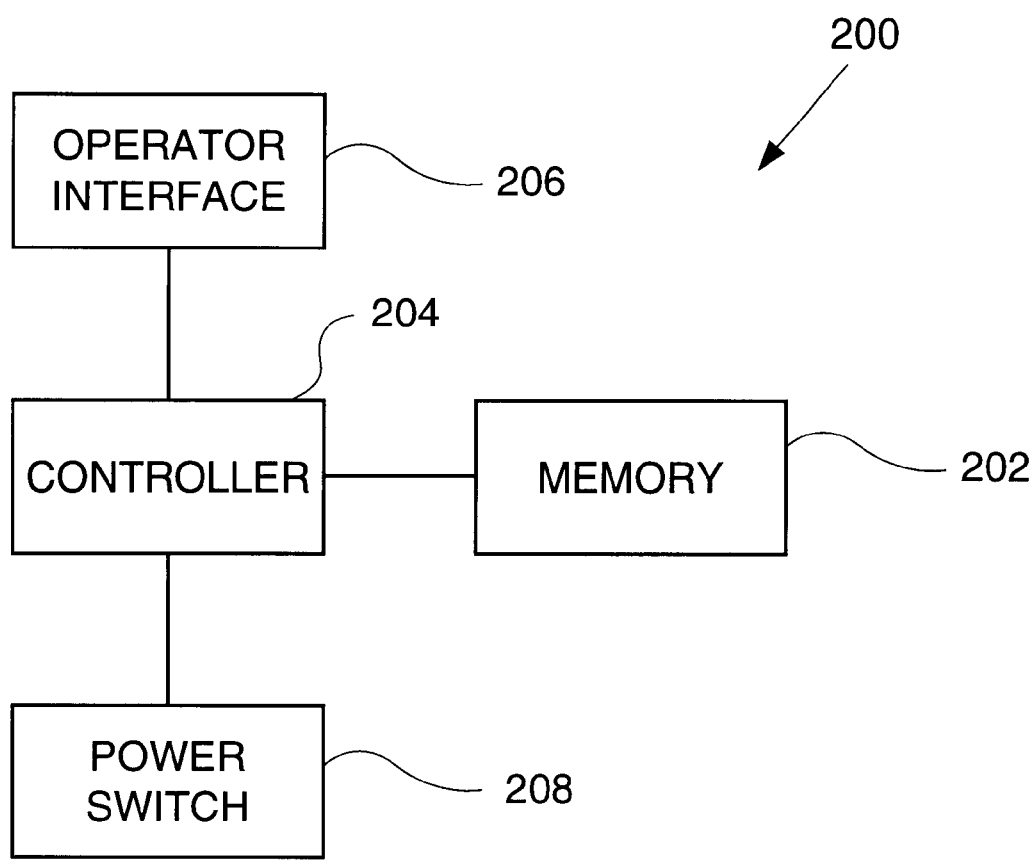
FIG. 2 is a schematic view of a configuration system used in connection with the preferred embodiment of the present invention.

In FIG. 2, the work machine 100 includes a configuration system 200 sufficient to provide at least one configuration parameter to the operator. Preferably, the configuration system 200 includes a memory 202 associated with a controller 204 and an operator interface 206. Preferably, the memory 202 is adapted to store at least one configuration parameter. Advantageously, configuration parameters such as the software or firmware version number, language, units of measure, operating parameters such as grade or slope units of measure, beeper enabled or disabled, and the like are stored in memory 202. The foregoing configuration parameters are representative of configuration parameters. However, other parameters well known in the art could be readily and easily used with the present invention without departing from the scope of the present invention as defined by the appended claims.

An operator interface 206, is adapted to provide at least one configuration parameter to the operator in the operator compartment 112. The operator interface 206 may be a liquid crystal display, console, keyboard, push buttons, voice recognition devices, a laptop computer, speakers, other interfaces well known in the art or, preferably, two eight character displays 300 (FIG. 3) in combination with switches 304 (FIG. 3).

Figure 3:
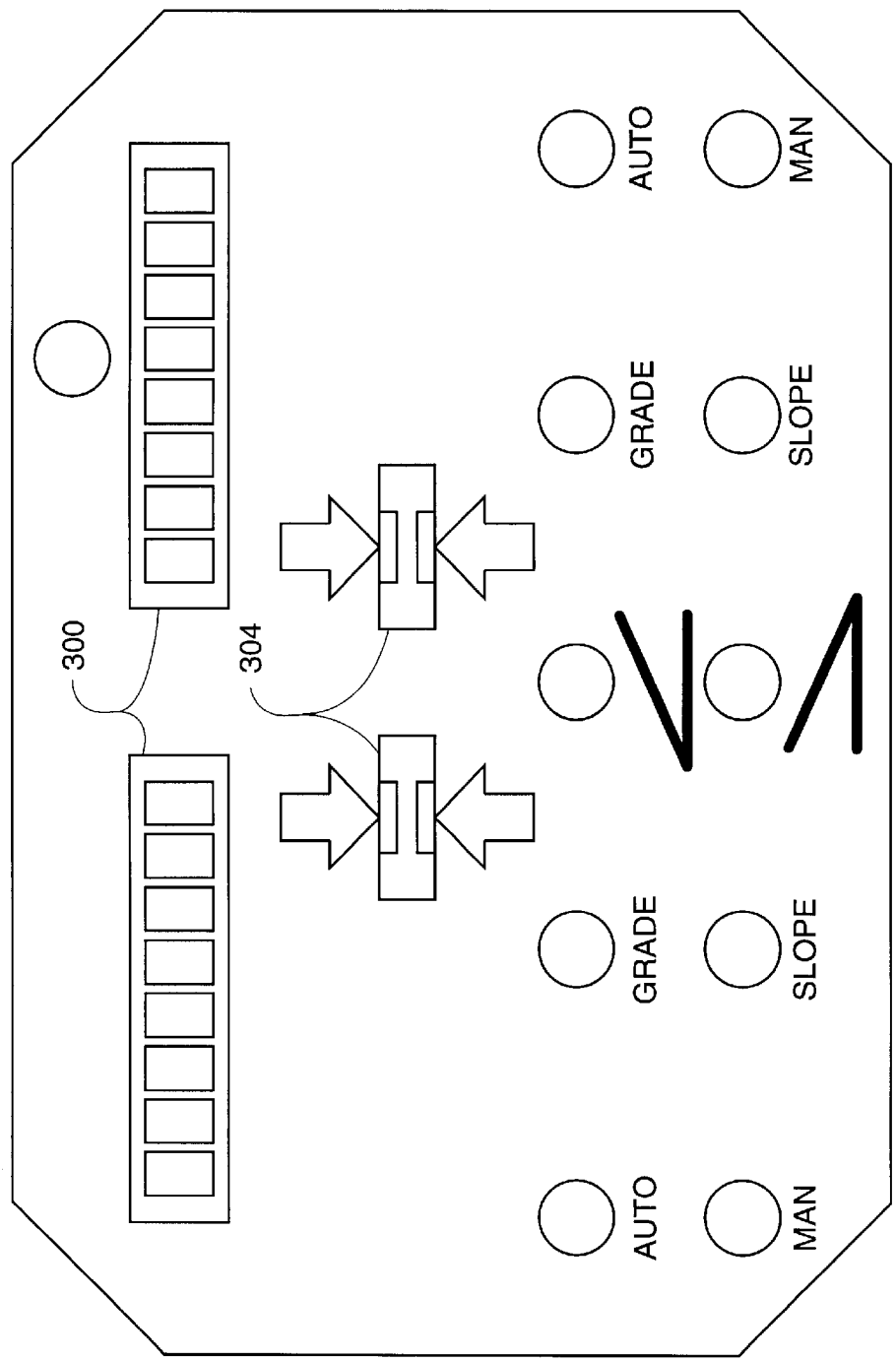
FIG. 3 is a top view of an operator interface used in connection with the preferred embodiment of the present invention.

An example of a preferred operator interface 206 is shown in FIG. 3. Preferably, the operator interface 206 is adapted to provide the text of at least one configuration parameter across at least one of the eight character displays 300.

Referring back to FIG. 2, a controller 204 is associated with the memory 202 and receives at least one configuration parameter from the memory 202. Advantageously, the controller 204 receives power from power switch 208. Further, controller 204 is adapted to determine whether the work machine control system is in power up mode based upon receiving power from power switch 208 and responsively provides the configuration parameters to the operator interface 206.

Referring now to FIG. 4, a flowchart of the software logic used in connection with the preferred embodiment is shown. Those skilled in the art could readily and easily write software implementing the flowchart shown in FIG. 4 using the instruction set, or other appropriate language associated with the particular microprocessor to be used. In a preferred embodiment, a Motorola 68HC11 is used in the electronic controller 204. However, other known microprocessors could be readily and easily used without deviating from the scope of the present invention as defined in the appended claims.

First block 401 begins the program control. Program control passes from first block 401 to first decision block 402. In first decision block 402, the electronic controller 204 determines whether the control system is in power up mode. In a preferred embodiment, controller 204 determines whether the control system is in power up mode based on receiving power from power switch 208. If the control system is not in power up mode, program control passes to second block 404. Otherwise, program control passes to third block 406.

In third block 406, program control reads configuration parameters from memory 202. Advantageously, configuration parameters are used by the controller 204 to configure the work machine 100 for performing a plurality of work functions. Many of the configuration parameters allow an operator to configure the work machine 100 in his or her native language or familiar units of measurement. Additionally, aspects of the control system such as whether a beeper is enabled or disabled may be used. From third block 406, program control passes to fourth block 408.

In fourth block 408, the controller provides at least one configuration parameter to the operator interface 206. Once the operator interface 206 receives the configuration parameter from the controller 204, the operator interface 206 provides the configuration parameter to the operator. In a specific embodiment, the operator interface 206 provides the configuration parameter to the operator as an audible message. In a specific embodiment, an audible tone or message is provided to the operator between configuration parameters. In a specific embodiment, the operator interface 206 provides the configuration parameter to the operator as a text message. Preferably, the operator interface 206 provides the configuration parameter as a text message using two eight character displays 300. One eight character display 300 is used to indicate the parameter being provided and the other eight character display 300 provides the parameter value or status. In this manner, the operator interface 206 indicates to the operator the current status or value of the configuration parameter. From fourth block 408, program control passes to second block 404.

In second block 404, program control returns to the main program. The logic of FIG. 4 is performed upon initially providing power to the controller 204 from power switch 208. However, those skilled in the art know that the aspects of the configuration system could be determined at other frequencies depending on other factors without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, instead of providing at least one configuration parameter to the operator during power up mode, an operator input command, for example pressing a switch 304, could be used to cause at least one configuration parameter to be provided to the operator. Further, the text messages could scroll across the eight character displays 300. However, a device or method incorporating any such embodiments should be understood to fall within the scope of the present invention as determined based upon the claims below and any equivalents thereof.

Industrial Applicability

Motor graders 102 having a blade 106 are often used to cut a grade and/or a slope across the earth. To accomplish this, often electronic control is used to assist the operator with controlling the blade 106 to provide the desired slope and/or grade. The electronic controls typically have several configuration parameters. Typically, each operator prefers different combinations of configuration parameters, particularly different functions enabled or disabled, language, and units of measure.

The apparatus and method of certain embodiments of the present invention, when compared with other methods and apparatus, may have the advantages of automatically providing configuration parameters to the operator during power up, eliminating the need for an operator to enter configuration mode or provide additional commands to learn the configuration of the work machine 100, reducing demands on the operator; and being more economical to manufacture and use. Such advantages are particularly worthy of incorporating into the design, manufacture, and operation of work machines 100. In addition, the present invention may provide other advantages that have not been discovered yet.

It should be understood that while the preferred embodiment as described in connection with motor grader 102 having a blade 106, the present invention is readily adaptable to provide configuration parameters to the operator on other work machines 100.

Other aspects, objects, and advantages of the present invention can be obtained from a study of the drawings, the disclosure, and the appended claims.

What is claimed is:

1. A work machine adapted to be controlled by an operator and configured for performing a plurality of work functions, comprising:
    a frame;
    a plurality of ground engaging devices supporting the frame;
    an operator compartment supported by the ground engaging devices;
    an engine operably coupled to the ground engaging devices;
    a work machine control system having a configuration system, including:
    a memory adapted to store at least one configuration parameter;
    an operator interface adapted to display the at least one configuration parameter to the operator in the operator compartment; and
    a controller associated with the memory and adapted to receive the at least one configuration parameter, determine whether the work machine control system is in power up mode and responsively display the at least one configuration parameter to the operator interface.

2. The work machine of claim 1, wherein the operator interface is adapted to provide the at least one configuration parameter to the operator in the operator compartment as a scrolling text message.

3. A method of providing configuration information to an operator of a work machine adapted to be configured for performing a plurality of work functions, comprising the steps of:
    determining whether a control system included on the work machine is in power up mode;
    reading at least one configuration parameter from a memory in response to said step of determining;
    providing the at least one configuration parameter to the operator, including providing a text message to the operator from a user interface, and including a step of scrolling the text message across the user interface.

4. A method of providing configuration information to an operator of a work machine adapted to be configured for performing a plurality of work functions, comprising the steps of:
    determining whether a control system of the work machine is in power up mode;
    reading at least one configuration parameter from a memory; and
    providing the at least one configuration parameter to the operator in a scrolling text message across a user interface in response to the control system of the work machine being in power up mode.

* * * * *